(12) United States Patent
Smith et al.

(10) Patent No.: US 10,469,253 B2
(45) Date of Patent: Nov. 5, 2019

(54) METHODS AND APPARATUS FOR MIGRATING KEYS

(71) Applicant: Intel Corporation, Santa Clara, CA (US)

(72) Inventors: Ned M. Smith, Beaverton, OR (US); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 15/116,102

(22) PCT Filed: Mar. 3, 2014

(86) PCT No.: PCT/US2014/019966
§ 371 (c)(1),
(2) Date: Aug. 2, 2016

(87) PCT Pub. No.: WO2015/133990
PCT Pub. Date: Sep. 11, 2015

(65) Prior Publication Data
US 2017/0170957 A1    Jun. 15, 2017

(51) Int. Cl.
*H04L 9/08* (2006.01)
*H04L 9/32* (2006.01)
(Continued)

(52) U.S. Cl.
CPC ............ *H04L 9/0822* (2013.01); *G06F 21/53* (2013.01); *H04L 9/0863* (2013.01);
(Continued)

(58) Field of Classification Search
CPC .................................................... H04L 9/0822
(Continued)

(56) References Cited

U.S. PATENT DOCUMENTS 8,726,343 B1 * 5/2014 Borzycki ............ G06F 21/6218
                                                                  726/1
9,111,105 B2 * 8/2015 Barton ..................... H04L 41/00
                                (Continued)

FOREIGN PATENT DOCUMENTS

CN          1741443          3/2006
CN          1902559          1/2007
                          (Continued)

OTHER PUBLICATIONS

International Preliminary Report on Patentability and Written Opinion Received for PCT Patent Application No. PCT/US2014/019966, dated Sep. 15, 2016, 9 pages.
(Continued)

*Primary Examiner* — Khalil Naghdali
(74) *Attorney, Agent, or Firm* — Barnes & Thornburg LLP (57) ABSTRACT

A destination data processing system (DPS) receives a key migration block from a source DPS. The key migration block includes an encrypted version of a primary key. The destination DPS receives user input that identifies (a) an authentication policy and (b) a context policy. The destination DPS collects authentication data from the user, based on the identified authentication policy. The destination DPS collects context data, based on the identified context policy. The destination DPS uses the authentication data and the context data to decrypt the key migration block. The authentication data may comprise multiple types of authentication data, possibly including biometric data. The user may also input an index, and the destination DPS may use the index to retrieve a number from a random number server. The destination DPS may use that number to decrypt the key migration block. Other embodiments are described and claimed.

25 Claims, 5 Drawing Sheets

(51) Int. Cl.
  H04W 12/04 (2009.01)
  G06F 21/53 (2013.01)
  H04L 29/06 (2006.01)
  H04W 12/06 (2009.01)
  H04W 12/00 (2009.01)

(52) U.S. Cl.
  CPC .......... *H04L 9/0877* (2013.01); *H04L 9/3231* (2013.01); *H04L 63/0428* (2013.01); *H04L 63/06* (2013.01); *H04L 63/20* (2013.01); *H04W 12/04* (2013.01); *G06F 2221/034* (2013.01); *H04L 63/0861* (2013.01); *H04W 12/00403* (2019.01); *H04W 12/06* (2013.01)

(58) Field of Classification Search
  USPC .......................................................... 713/168
  See application file for complete search history.

(56) References Cited

U.S. PATENT DOCUMENTS

| | | | |
|---|---|---|---|
| 9,529,871 B2* | 12/2016 | Vibhor | G06F 17/30557 |
| 2002/0196946 A1 | 12/2002 | Challener et al. | |
| 2003/0147537 A1 | 8/2003 | Jing et al. | |
| 2007/0150734 A1 | 6/2007 | Gervais et al. | |
| 2010/0158253 A1 | 6/2010 | Challener et al. | |
| 2012/0221854 A1* | 8/2012 | Orsini | G06F 21/606 713/167 |
| 2012/0233466 A1 | 9/2012 | Chu et al. | |
| 2012/0246463 A1 | 9/2012 | Shea et al. | |
| 2013/0347064 A1 | 12/2013 | Aissi | |

FOREIGN PATENT DOCUMENTS

| | | |
|---|---|---|
| CN | 2888514 | 4/2007 |
| CN | 101241527 A | 8/2008 |
| TW | I578749 | 4/2017 |
| WO | 2013010427 | 1/2013 |
| WO | 2015/133990 A1 | 9/2015 |

OTHER PUBLICATIONS

Translation of Office Action dated Nov. 16, 2017 for Korean patent Application No. 2016-7021100, 6 pages.
Pearson, Siani, Marco Casassa-Mont, and Manny Novoa, "Securing information transfer in distributed computing environments," IEEE Security & Privacy 6.1 (published in 2008).
International Search Report with Written Opinion received for PCT Application No. PCT/US2014/019966 dated Nov. 28, 2014, 12 Pages.
Office Action and Search Report received for Taiwan Patent Application No. 104102125, dated Aug. 22, 2016, 13 pages of Taiwanese Office Action and 2 Pages of Search Report including 1 Page of English Translation.
First Office Action dated Jul. 27, 2018 for Chinese patent Application No. 201480074834.5, 12 pages.
Second Office action in Chinese patent application No. 201480074834.5, dated Apr. 1, 2019, including machine translation.
Second Office action in Chinese patent application No. 201480074834.5, dated Apr. 1, 2019, including machine translation (11 pages).
Office action in European patent application No. 14884957.3, dated Apr. 2, 2019 (6 pages).

* cited by examiner

METHODS AND APPARATUS FOR MIGRATING KEYS

CROSS-REFERENCE TO RELATED APPLICATIONS

This application is a national stage patent application under 35 U.S.C. § 371, based on international patent application number PCT/US2014/019966, filed Mar. 3, 2014.

TECHNICAL FIELD

Embodiments described herein relate generally to data processing and in particular to methods and apparatus for migrating keys.

BACKGROUND

Digital keys are vital for many different aspects of computer security. For instance, to provide for secure communications between computers, a key may be used to encrypt the communications. Also, to provide for authentication of a message, a key may be used to digitally sign the message before the message is transmitted from a sender to a recipient.

For effective security, some types of keys must be kept private. For instance, public key cryptography involves a pair of keys, with one of the keys being public and the other key being private. In addition, it is sometimes necessary to copy or migrate a private key from one device to another. For instance, if a user of an old personal computer (PC) acquires a new PC, the user may need to migrate one or more private keys from the old PC to the new PC.

The present disclosure describes methods and apparatus for migrating keys.

DESCRIPTION OF EMBODIMENTS

For purposes of this disclosure, a key to be migrated may be referred to as a primary key. To migrate a primary key from one device to another, the owner of the primary key may save the primary key in a file, and that file may then be copied from one device to the other. For purposes of this disclosure, a file containing a primary key to be migrated may be referred to as an archive file or a key migration block.

Various Public-Key Cryptography Standards (PKCS) include certain teachings with regard to keys. For instance, the standard known as PKCS #12 describes a file format that may be used to store keys. According to PKCS #12, a primary key is encrypted with a key encryption key (KEK), and then that encrypted version of the primary key is stored in the archive file. The archive file may also be referred to as a PKCS #12 block.

According to PKCS #12, a key derivation function (KDF) is used to derive or generate the KEK. In particular, according to PCKS #12, the user provides the KDF with a personal identification number (PIN), and the KDF uses that PIN to generate the KEK. The user should then keep the PIN secret, only sharing it with a desired target entity. The target entity may obtain the cleartext KEK by inputting the PIN to the PKCS#12 algorithm. The target entity may then use the KEK to decrypt the primary key from the PKCS #12 block.

According to PKCS #12, anyone who knows or guesses the PIN can use the PIN with the KDF to generate the same KEK. Thus, the PKCS #12 standard is subject to brute force attacks, including dictionary attacks on the PIN. For instance, an attacker could conduct an offline dictionary attack to break PKCS #12. This risk is particularly acute when the PKCS #12 block is publicly available (e.g., on a data storage device that may be accessed remotely). For purposes of this disclosure, data storage devices that may be accessed remotely may be referred to collectively as "the cloud." Cloud storage services are currently provided under names or trademarks such as DROPBOX, GOOGLEDOCS, SKYDRIVE, ICLOUD, and others. Cloud storage services can be attractive alternatives to traditional key escrow and key migration services. However, typical cloud storage services lack security and access control semantics necessary to implement robust key migration.

Furthermore, if a PKCS #12 block is available publically on the cloud, it may be easy for attackers to obtain a copy of the block for an off-line dictionary attack. The PKCS #12 standard describes a method for packaging keys into a transportable format, but that standard does not define reliably secure methods for managing migration or access. More information about PKCS #12 may be found on the Internet at en.wikipedia.org/wiki/PKCS_12.

The present disclosure describes methods and apparatus for migrating keys more securely. As explained below, for purposes of illustration, the present disclosure describes one or more example embodiments. However, the present teachings are not limited to those particular embodiments.

The present disclosure describes a method for key migration that is self-directed, in that the owner of the key has greater ability to specify and enforce the migration process. In at least one embodiment, the method is performed without the aid of a migration authority or any other trusted or educated third parties. In another embodiment, the method is performed with one or more trusted third parties and one or more educate third parties, but with no third party that is both trusted and educated. For example, the method may use a data server that is considered educated because it knows the source and the destination of a key migration block, but not considered trusted because it does not know the secrets needed to unwrap the key migration block to obtain the encrypted key. And the method may use a random number server, an authentication policy server, and a context policy server that are considered trusted because each knows some of the secrets needed to obtain the encrypted key. However, the method may require the random number server, the authentication policy server, and the context policy server to be separate and distinct, so that an attacker would need to compromise all three in order to complete an attack.

One embodiment uses several additional components for key derivation while separating the methods for including or obtaining those components, applying a security principle known as separation-of-duties. For instance, multiple services (which may be under user control or contracted out to a trusted service provider) may each contribute a different portion of the material needed for key derivation. Only when all of the material is correctly presented will the key migration succeed. Attackers therefore must compromise all of the staging services which contribute input for key derivation before being able to defeat the security. Furthermore, the endpoint at which the various staging service providers release their inputs may be hardened using trusted execution environment (TEE) technologies such as the Software Guard eXtensions (SGX) developed by Intel Corporation and/or the Converged Security Engine (CSE) developed by Intel Corporation. In addition or alternatively, endpoints may use environments protected by the security extensions provided by ARM Holdings PLC under the TRUSTZONE trademark, by virtualization technology, and/or by other hardening technologies. A CSE is a hardware security engine embedded in a system-on-chip (SoC) that isolates execution from the main CPUs and memory. More information on SGX may be found on the Internet at software.intel.com/en-us/blogs/2013/09/26/protecting-application-secrets-with-intel-sgx.

As described in greater detail below, this disclosure describes a method for user-directed key migration involving rich, context-sensitive policies controlling access on the termination point of migration, where cloud storage services may be used to facilitate the migration.

In at least one embodiment, the method involves TEEs on both the source and target endpoints of migration, and the method involves a KDF that incorporates use of authentication, authorization, and contextual inputs. Successful migration requires successfully re-deriving a KEK on the target endpoint, in order for a wrapped primary key to be decrypted and therefore available for use.

Storage of a key migration block on a cloud service may expose the block to attackers who may have compromised the cloud service or to insiders who have authorization to maintain the cloud service and therefore may have access to subscriber content. Cloud content is therefore subject to brute force attacks including known ciphertext attacks, known plaintext attacks, dictionary attacks and man-in-the-middle attacks. However, according to the present disclosure, in at least one embodiment, different KDF inputs are managed by different entities. So no single entity maintains all the inputs necessary to re-derive a KEK. Consequently, to successfully break into a migration block in transit, an attacker would need to successfully compromise all entities providing input.

Figure 1:
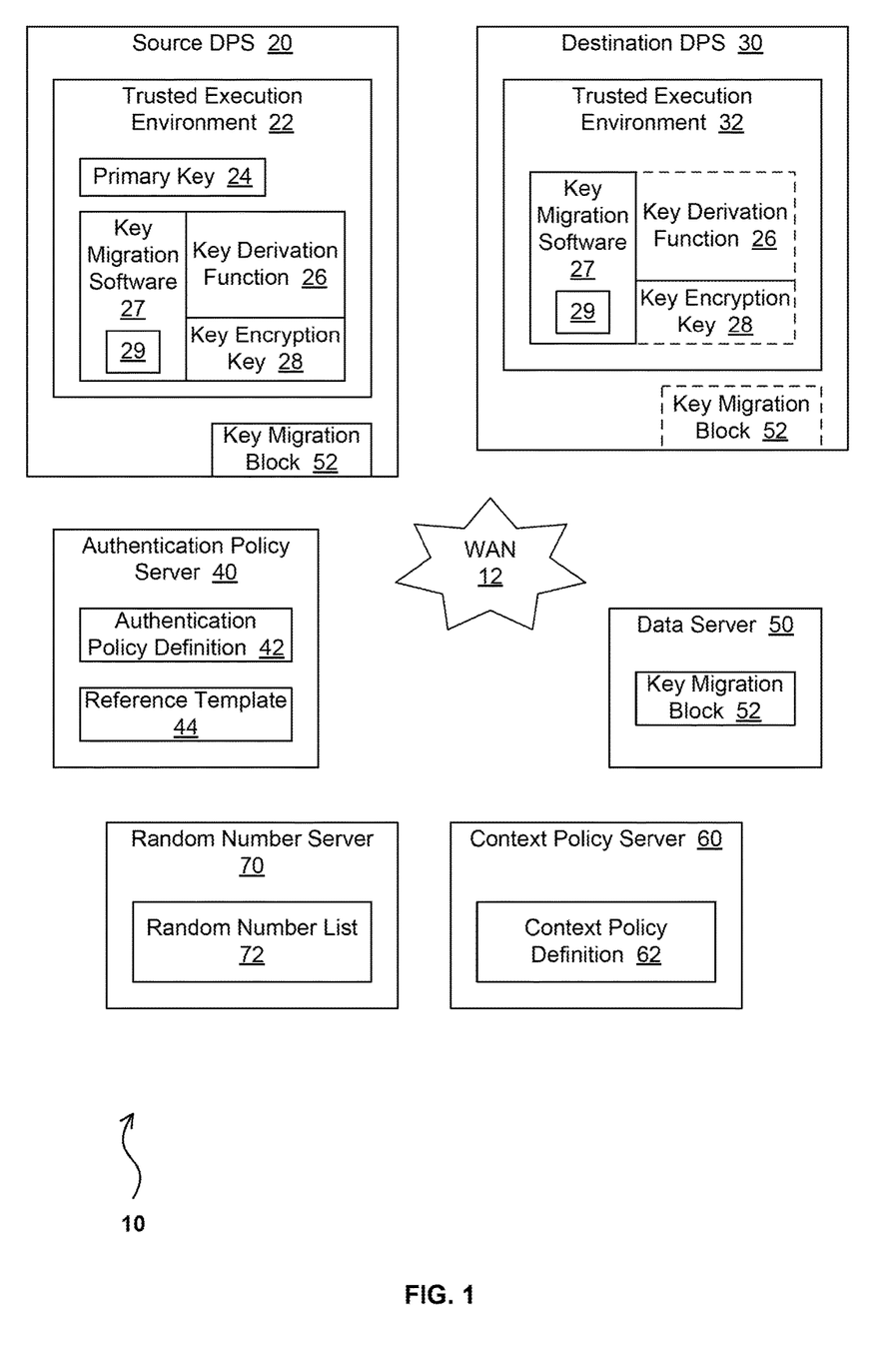
FIG. 1 is a block diagram of an example distributed data processing system with features for migrating keys.

FIG. 1 is a block diagram of an example distributed data processing system 10 with features for migrating keys, according to one embodiment. In the embodiment of FIG. 1, distributed data processing system 10 includes a source data processing system (DPS) 20 and a destination DPS 30. As shown, source DPS 20 and destination DPS 30 are configured to provide respective TEEs 22 and 32. As described in greater detail below, distributed data processing system 10 also includes an authentication policy server 40, a random number server 70, a context policy server 60, and a data server 50. In the embodiment of FIG. 1, the various processing systems within distributed data processing system 10 can communicate with each other via a wide area network (WAN) 12, such as the Internet. In one embodiment, authentication policy server 40, context policy server 60, and random number server 70 are trusted, while data server 50 is untrusted. Similarly, TEE 22 and TEE 32 are trusted, while source DPS 20 and destination DPS 30 may also include host software that is untrusted. For purposes of this disclosure, an item may be considered trusted if it has or "knows" secret information, where secret information is information needed to decrypt the key migration block. By contrast, an item may be considered untrusted if it does not have access to any secret information.

As shown in FIG. 1, source DPS 20 has a primary key 24 stored in TEE 22. In one embodiment, primary key 24 is a private key. Also, as described in greater detail below, source DPS 20 executes a KDF 26 within TEE 22 to generate a KEK 28, and source DPS 20 then uses KEK 28 to generate a key migration block 52 for primary key 24. Source DPS 20 may then copy key migration block 52 to data server 50. As described in greater detail below, a user may then use destination DPS 30 to retrieve key migration block 52 from data server 50; and if the user can provide and/or obtain all of the necessary inputs, the user can then extract primary key 24 from key migration block 52 within TEE 32.

Figure 2:
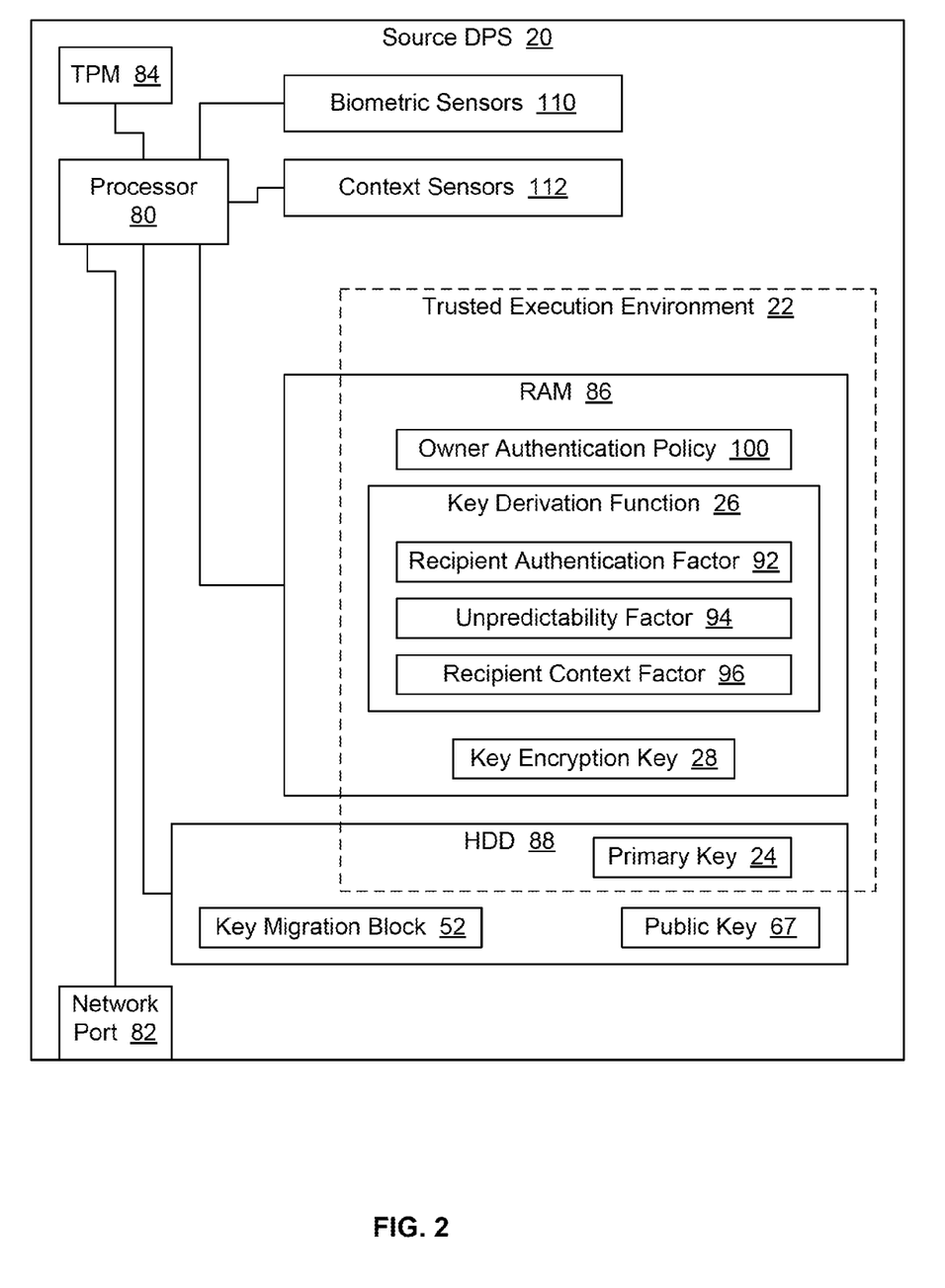
FIG. 2 is a block diagram illustrating the source data processing system of FIG. 1 in greater detail.

FIG. 2 is a block diagram illustrating source DPS 20 in greater detail. In the embodiment of FIG. 2, source DPS 20 includes random access memory (RAM) 86, a hard disk drive (HDD) 88, a network port 82, a trusted platform module (TPM) 84, one or more biometric sensors 110, and one or more context sensors 112, in communication with a processor 80. In addition or alternatively, source DPS 20 may include other types of storage devices (e.g., flash memory), other input/output (I/O) ports, multiple processors, and/or other components. The composition of destination DPS 30 may be the same as or similar to that of source DPS 20. Authentication policy server 40, data server 50, context policy server 60, and random number server 70 may also include components like those in source DPS 20 and/or any other suitable components.

As illustrated by the box with dashed lines, a portion of the storage in RAM 86 and a portion of the storage in HDD 88 are protected within TEE 22. Software executing outside of TEE 32 is not able to access any of the storage areas protected by TEE 22. Likewise, TEE 32 may protect portions of the storage areas in RAM and in a HDD (and/or other storage devices) in destination DPS 30. And as indicated below, no software is allowed to execute within TEE 22 unless that software has first been verified as safe.

Figure 3:
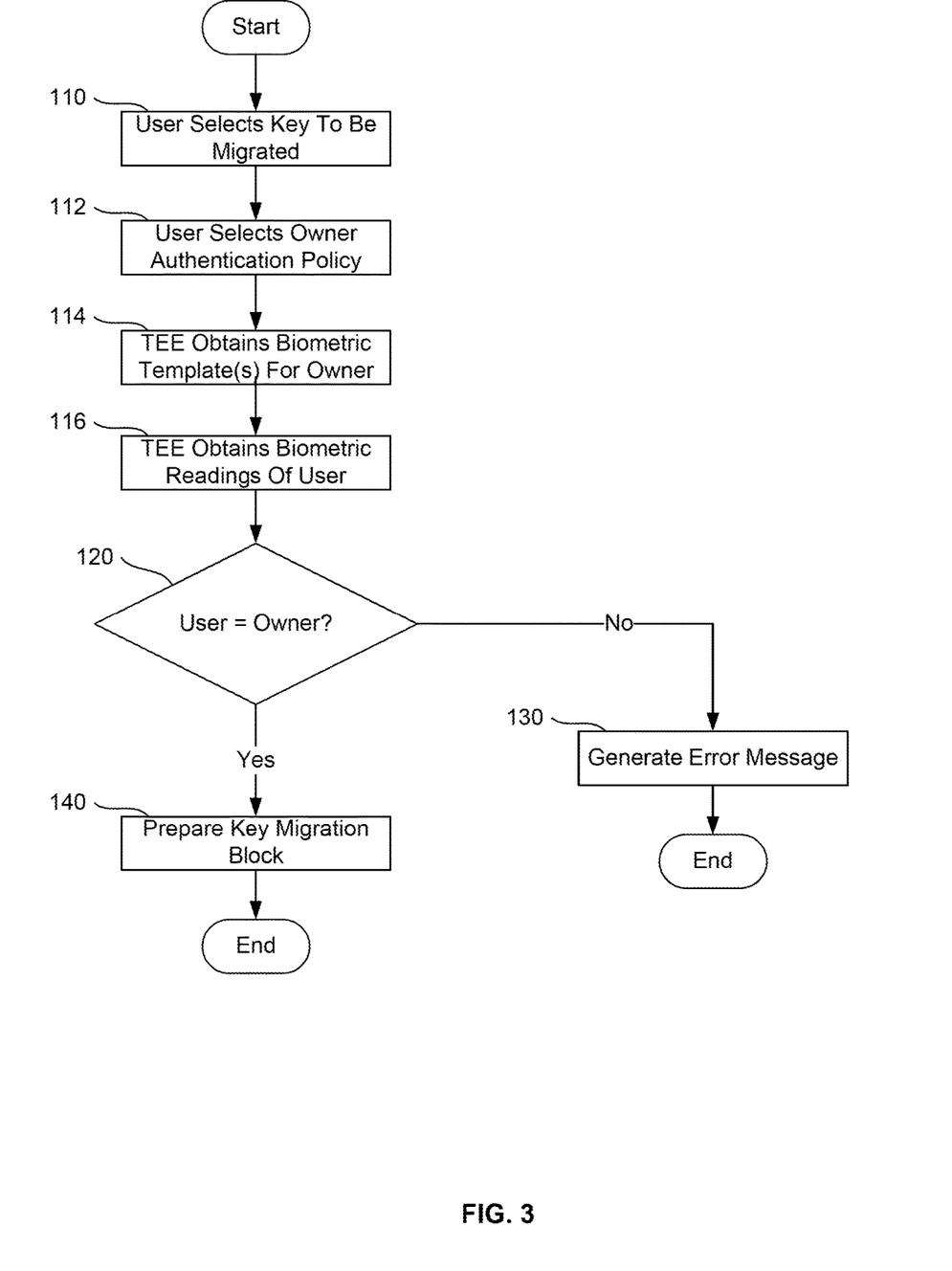
FIG. 3 is a flowchart of an example process for authenticating an owner of a key before preparing a key migration block for the key.

FIG. 3 is a flowchart of an example process for authenticating an owner of a primary key before preparing a key migration block for the primary key. For purposes of discussion, the owner of the primary key may be referred to as Alice, and the target (e.g., the person that Alice wants to receive the primary key) may be referred to as Bob. However, in some situations (e.g., if Alice has obtained a new PC to replace an old PC, and she is migrating a key from the old PC to the new PC, Alice may also act as Bob.

In summary, Alice identifies the key she wishes to migrate to Bob's device. The key is protected in a source TEE that Alice trusts is not compromised by host malware. Alice authenticates to the source TEE using an appropriately strong multifactor authentication policy that she determines. Context sensors may be used to collect biometric data of her identity according to a biometric template. Her trusted authentication template provider (which may be a trusted service she already subscribes to) supplies her reference template of her identity to the TEE allowing the TEE to authenticate Alice to the TEE.

In particular, the process of FIG. 3 may operate in source DPS 20, beginning at block 110 with the user of source DPS 20 (e.g., Alice) selecting a private key to be migrated. For instance, the user may select primary key 24 to be migrated. As illustrated in FIGS. 1 and 2, primary key 24 is protected in source DPS 20 by TEE 22. Due to the nature of TEE 22, the owner of primary key 24 may trust that TEE 22 is not compromised by host malware.

For instance, TEE 22 (and TEE 32) may provide a TEE environment in which code is executed on a CPU core that is isolated from the rest of the platform, and data is stored in storage that is isolated from the rest of the platform. The TEE environment may also have isolated signaling (e.g., interrupts) and trusted I/O (e.g., using dedicated I/O devices that cannot be accessed except through the TEE). Furthermore, in at least one embodiment, the software (including firmware) to execute in the TEE is signed, and that signature is verified before being allowed to execute. In addition, a TEE environment may also encrypt and decrypt code and data. For instance, before storing data on a device that may be accessed from outside the TEE, the TEE may encrypt that data.

As shown at block 112 of FIG. 3, the user may also select an owner authentication policy for source DPS 20 to use to verify that the current user is the owner of the primary key. In one embodiment, TEE 22 retrieves multiple authentication policy definitions 42 from authentication policy server 40, and then TEE 22 displays a list with descriptions or summaries of those authentication policies, with corresponding indexes. The user then selects one of those policies. In one embodiment, each of the policies requires multiple authentication factors to be verified to authenticate the user as the owner. For example, TEE 22 may present a list of policies including the following:

a first policy requiring authentication of a fingerprint and a voice print;
a second policy requiring authentication of a fingerprint and a retina image; and
a third policy requiring authentication of a voice print and a retina image.

Authentication policies may include any suitable type or types of authentication data or factors, including without limitation finger vein, palm vein, iris scan, electrocardiogram (ECG) readings, smartcard token, one-time-password token, geo-fence proximity, user-presence sensing, etc.

For purposes of this disclosure, a biometric template is a set of biometric data for a particular type of biometric measurement (e.g., a thumbprint) for a particular person. To authenticate that a person is who the person claims to be, a new biometric measurement is performed to generate a new biometric template, and then the new template is compared against one or more reference templates.

As shown at block 114, once the user has selected the authentication policy, TEE 22 obtains one or more reference biometric templates for the owner of primary key 24 from authentication policy server 40, as needed for the selected policy. In one embodiment, authentication policy server 40 provides reference templates 44, as well as authentication policy definitions 42. Accordingly, authentication policy server 40 may also be referred to as an authentication template server. In other embodiments, separate authentication policy servers and authentication template servers may be used. In the embodiment of FIG. 1, authentication policy server 40 may include reference templates with biometric authentication data for many different people, including one or more reference templates 44 for the owner of primary key 24, as shown in FIG. 1. Reference template 44 may include biometric data for the fingerprint, the voice print, and the retina image of the owner of primary key 24. In an alternative embodiment, each different type of biometric data for a person may be stored in a different template.

As shown at block 116, TEE 22 then obtains biometric data from the current user. For instance, TEE 22 may scan a fingerprint, scan a retina, and/or record a voice print from the current user. As shown at block 120, TEE 22 then compares the biometric data from the current user with the biometric data in reference template 44 to determine whether the current user is the owner.

Thus, the user authenticates to TEE 22 using an appropriately strong multifactor authentication policy that he or she determines. If the biometric data does not match, TEE 22 may display an error message, as shown at block 130, and the process may then end. However, if the biometric data matches, TEE 22 may proceed to prepare key migration block 52, as shown at block 140 and described in greater detail below.

Figure 4:
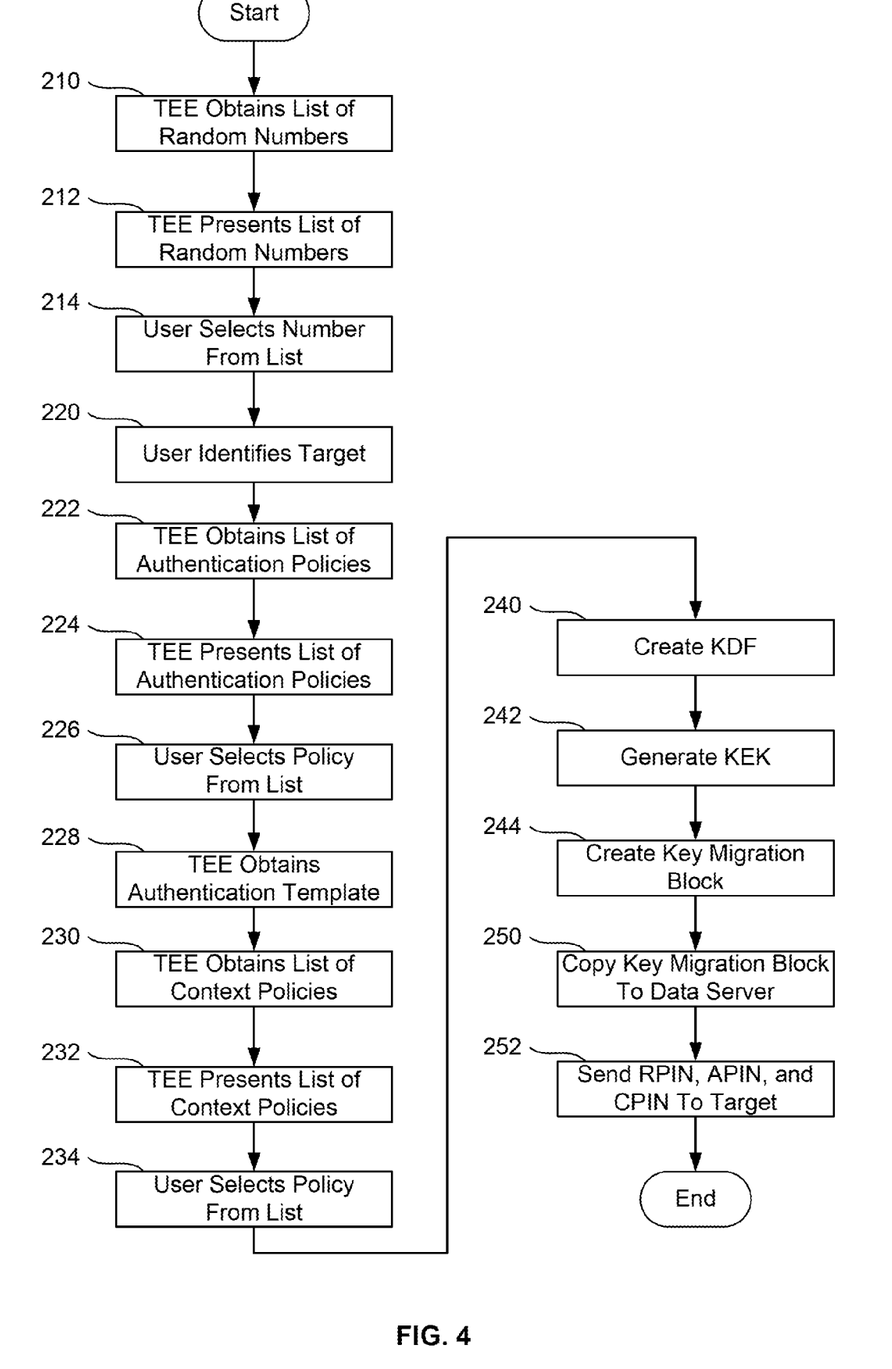
FIG. 4 is a flowchart of an example process for preparing a key migration block.

FIG. 4 is a flowchart of an example process for preparing key migration block 52. In one embodiment, source DPS 20 uses the process of FIG. 4 to implement block 140 of FIG. 3.

Alice wants key migration block 24 to be protected from brute force cryptographic attacks. So, as shown at block 210, the process of FIG. 4 starts with Alice using TEE 22 to obtain a list of random numbers from random number server 70. Alternatively, Alice may generate such a list herself using a random number generator in the TEE, and then share the list with random number server 70. In either case, she doesn't tell random number server 70 which number from the list she will use in the KDF. This is to ensure that an employee or other insider at random number server 70 is not able to easily learn Alice's selection.

As shown at block 212, TEE 22 then presents the list to Alice using a trusted I/O technology, such as the technology distributed under the name or trademark INTEL IDENTITY PROTECTION TECHNOLOGY (INTEL IPT) with protected transaction display. Additional details concerning INTEL IPT with protected transaction display may be found on the Internet at www.intel.com/content/www/us/en/architecture-and-technology/identity-protection/protected-transation-display.html. As shown at block 214, Alice may then select one of the random numbers from the list using a randomized PIN pad display, where the PIN corresponds to the row number in the list. For instance, a PIN value of 00001 may denote the first entry in the list, and a PIN value of 01234 may denote the $1,234^{th}$ entry. The PIN that identifies the selected random number may also be referred to as the random-number PIN or RPIN. Alice should remember the RPIN value (i.e., the row number she selected), because that number will eventually be needed to extract primary key 24 from key migration block 52.

In addition or alternatively, Alice may append one or more bits to the RPIN (and/or to any of the other PINs). The key migration software may use those bits as direct input to KDF 26, to further prevent insider attacks. Similarly, when Bob unwraps primary key 24 at destination DPS 30, Bob may need to append the same values as were appended by Alice, so that key migration software at destination DPS 30 can use those bits as direct input to KDF 26 as well.

As shown at block 220, Alice then enters or selects an identifier to identify the desired target (i.e., the person or entity that should be able to extract primary key 24 from key migration block 52). For instance, Alice may identify the desired target as "IdProvider/Bob," where "IdProvider" is a string that identifies a particular domain, and "Bob" is the userid for the target within that domain. Any value that serves to distinguish between different targets may be used for the domain, or the domain may be omitted if disambiguation of the userid is not needed.

As shown at block 222, Alice may also obtain a list of authentication policies from authentication policy server 40.

The list may include multiple authentication policy definitions 42, along with descriptions or summaries of each authentication policy, and corresponding indexes. In one embodiment, authentication policy server 40 provides TEE 22 with a list of multi-factor authentication (MFA) policies. The list may include multiple rows, with each row having (a) a row number or index (e.g., "00001") (b) a textual description or summary of a particular authentication policy (e.g., "Authenticate Intel chipset rel 1.0, fingerprint, face, Intel 3D camera v1"), and (c) the full expression of that policy. For instance, an example authentication policy and an example context policy may be expressed as follows:

```
"device": "ALICE-MOBL2",
"sp": " IT MFA Policy Server Pub Key",
"defaultMFAPolicies": [
    {
    "environment": "Host",
    "action": { "OS logon": [
        {"level": "1",
        "actionResults": [
            "UserCredentialsReleased " : "domain password",
        ] //actionResults
        }, //level
        {"level": "2",
        "actionResults": [
            "UserCredentialsReleased " : "domain password",
            "DeviceCredentialsReleased": "Asymmetric"
            ] //actionResults
        }, //level
    ]}, //action
    "MfaSet": [
        {"level": "1",
        "environment": "SecurityEngine",
        "factorSet": [
            {"environment": "SecurityEngine",
            "factors": [
                {"factorType": "NFC", "continuous": false,
                "factorEnv": "SecurityEngine",
                "factorEntailment": "Intel chipset rel 1.0"}
            ]}//factors
        ] //factorSet
        },
        { "level": "2",
        "environment": "SecurityEngine",
        "factorSet": [
            {"environment": "SecurityEngine"
            "factors": [
                {"factorType": "fingerprint", "continuous": false,
                "factorEnv": "SecureElement",
                "factorEntailment": "Authentec v1"}
            ]},//factors
            // ---logical OR---
            {"environment": "SecurityEngine",
            "factors": [
                {"factorType": "PTD", "continuous": false,
                "factorEnv": "SecurityEngine",
                "factorEntailment": "Intel DAL v9"},
                {"factorType": "3DFace", "continuous": true,
                "factorEnv": "Host",
                "factorEntailment": "Intel 3D camera v1"}
            ]}//factors
        ] // factorSet
        }
    ] //MfaSet
    },
    {
    "environment": "Host",
    "action": { "VPN": [ etc...]}
    }
]//defaultMfaPolicies
"defaultContextPolicies": [
    {"contextSet": [
        "environment": "Host",
        "context": {"contextType": "userPresence",
            "trigger": "onNotPresent",
            "notify": [
                "OS Login",
                "VPN"
            ], //notify
            }, //trigger
        "factorSet": [
            {"environment": "SecurityEngine",
            "factor": {"factorType": "irProximity", "continuous": true,
                "factorEnv": "SecurityEngine",
                "factorEntailment": "Intel chipset rel 1.0"},
```

-continued

```
            "factor": {"factorType": "KeyboardActivity", "continuous": false,
                "factorEnv": "OS",
                "factorEntailment": "Keyboard Vendor"}
            }] //factorSet
    }//context
    "context": {"contextType": "geoFence", "fenceDef": "OID_x",
            "trigger": "onEnter",
            "notify": [
                "OS Login",
                "VPN",
                "FDE",
                "IdP",
                // etc...
            ], //notify
            "trigger": "onExit",
            "notify": [
                "OS Login",
                "VPN",
                "FDE",
                "IdP",
                // etc...
            ], //notify
            "factorSet": [
                "environment": "SecurityEngine"
                "factor": {"factorType": "WiFiLocation", "continuous": true,
                "factorEnv": "SecurityEngine",
                "factorEntailment": "Intel Sensor Hub 1.0"}
    }//context
    ]} //contextSet
] //defaultContextPolicies
```

As shown at blocks 224 and 226, TEE 22 may present the list (or just the indexes and textual summary from the list) using a trusted output technology, and Alice may then select from the list a desired policy to be used to authenticate the target. For instance, Alice may select the desired authentication policy from the list using a randomized PIN pad display, where the PIN matches the index or row number in the list. The PIN that identifies the selected authentication policy may also be referred to as the authentication-policy PIN or APIN. Alternatively, for the authentication policy for the target, TEE 22 may simply use the same authentication policy (and the corresponding APIN) that TEE 22 used to authenticate Alice. In either case, Alice should remember the index or APIN value, because that number will also eventually be needed to extract primary key 24 from key migration block 52.

As shown at block 228, TEE 22 may then use the selected authentication policy and the specified identifier for the target to obtain one or more reference templates for the target from authentication policy server 40. TEE 22 may then hash the reference template(s). In order to honor the target's privacy policy, TEE 22 may prevent the template from being expose outside of TEE 22. In addition, TEE 22 may hash the textual summary and/or the full expression of the selected authentication policy.

As shown at block 230, TEE 22 may then obtain multiple context policy definitions 62 from context policy server 60. Each context policy definition 62 may prescribe certain attributes or elements as necessary parts of the context within which key migration block 52 is to be decrypted. Those attributes may include, without limitation, location (e.g., geofence coordinates or boundaries), time of day, version of target TEE software, etc. As shown at blocks 232 and 234, TEE 22 may present the list of context policies to Alice (e.g., displaying an index and a textual description or summary of each context policy), and Alice may select a desired context policy from the list. TEE 22 may use techniques such as those described above (e.g., trusted I/O technology) to present the list and to receive input (e.g., a PIN to identify the selected row or index) from Alice. The PIN that identifies the selected context policy may also be referred to as the context-policy PIN or CPIN.

Alternatively, Alice may manually author a context policy that specifies these required elements using a policy definition language such as eXtensible Access Control Markup Language (XACML), and she may then upload the policy to context policy server 60.

In addition to specifying which contextual elements are to be considered, Alice may specify the necessary values for some or all of those elements. For instance, in addition to specifying that time and location are part of the required context, Alice may specify which specific times are acceptable, and which specific locations. The actual values (reference values) can be included with the policy, or using a separate file that follows the structure of the policy.

TEE 22 may then hash the textual summary and/or the full expression of the selected context policy.

As shown at block 240, TEE 22 then builds KDF 26. In one embodiment, TEE 22 creates KDF 26 to include many or all of the elements references above, such as:
    the random number selected by Alice (e.g., "Rand1234");
    the corresponding RPIN value;
    the specified identifier of the desired target (e.g., "IdProvider/Bob");
    the APIN;
    the hash of the textual description of the selected authentication policy (e.g., "AuthPolicy")
    the hash of each reference templates for the target (e.g., "RefTplt_Bob");
    the CPIN; and
    the hash of the textual description of the selected context policy (e.g., "ContextPolicy").

As shown at block 242, TEE 22 may then use KDF 26 to generate KEK 28.

Thus, in one embodiment, the KDF may be described as follows:

KEK=KDF(Rand1234, RPIN, "IdProvider/Bob", APIN, Hash(AuthPolicy), Hash(RefTplt_Bob), CPIN, Hash (ContextPolicy))

Alternatively, the KDF may be described as follows:

$$rand = \text{Fetch\_random\_number\_server}(RPIN),$$

$$context = [\text{auth\_value} = \text{Fetch\_authentication\_template\_server}(APIN),$$

$$\text{context\_value} = \text{Fetch\_context\_policy\_server}(CPIN)],$$

$$\ldots$$

$$\text{wrap\_key} = KDF(rand, \text{label}, \text{context}, \ldots)$$

As shown at block 244, Alice may then use KEK 28 to create key migration block 52. In other words, Alice may use KEK 28 to wrap primary key 24. Key migration block 52 may be a PKCS #12 block, for example. As shown at block 250, Alice may then copy key migration block 52 to data server 50. Data server 50 may provide cloud storage services, and key migration block 52 may reside on data server 50 until the time Alice needs to complete the migration to Bob. Once migration has been completed, data server 50 may delete key migration block 52. Alternatively, data server 50 may archive key migration block 52 for a while, acting as a backup/restore service, in addition to a replication/migration service.

As shown at block 252, Alice may send data to Bob, to equip Bob with information that will be needed to unwrap primary key 24. For instance, Alice may provide Bob with the RPIN, the APIN, and the CPIN. Other such data items may include the string used by Alice as Bob's identifier, a description of the authentication factors required and any required contextual conditions, etc. Alice may use any suitable technique or combination of techniques to send the necessary information to Bob. For instance, Alice may meet Bob in person to tell him one or more items of information (e.g., the RPIN), and/or Alice may send one or more items of information to Bob via email, via a universal serial bus (USB) device, in writing on a piece of paper, etc.

The process of preparing to migrate private key 24 may then end.

According to one embodiment, the first parameter of KDF 26 is a random number. This value may also be considered to be a key derivation key (KDK), according to the convention described in National Institute of Standards and Technology (NIST) Special Publication 800-108, "Recommendation for Key Derivation Using Pseudorandom Functions," Lily Chen, October 2009 ("SP800-108"). Subsequent parameters for KDF 26 may be concatenated together and implemented essentially as an expansion of the "label" parameter of the pseudorandom function (PRF) described in SP800-108. Other parameters from SP800-108 may also be used by KDF 26. As described in greater detail below, the target may use the RPIN, APIN, and CPIN parameters to lookup actual values to be included in the KDF used to unwrap private key 24. Alternatively, the looked up values may be used in a PRF according to SP800-108, with the KDF using that PRF. They RPIN, APIN, and CPIN parameters are included in the KDF definition to show what values need to be communicated from Alice to Bob and then supplied to a function that constructs the actual PRF.

In the operations described above, TEE 22 opens a session with each of random number server 70, authentication policy server 40, and context policy server 60 to obtain elements identified by the RPIN, APIN, and CPIN as indexes. Those elements are then included in the input parameters for KDF 26. The PIN values may also be included in the KDF to ensure that Bob obtained information about the migration transaction from Alice, and that Bob's TEE uses the same servers as Alice. KDF 26 may include the reference template(s) of Bob's identity to assert that only a specific template match may be used. In other words, Alice may select a reference thumbprint collected on Jan. 2, 2012 at 1:15 pm, for example. And then the thumbprint provided by the target must match that particular reference thumbprint. KDF 26 may include the CPIN and the hash of the context policy to specify the contextual environment in which primary key 24 may be unwrapped.

Thus, according to the present disclosure, a TEE may select a KDK for use as a PRF parameter by using a PIN and an algorithm or service for selecting the KDK from a list of potential KDKs. The cryptographic value of this approach is the random number server or random number provider (RNP) can generate a list of very large random numbers (e.g., 512 bytes or more). This ensures lots of entropy in the KDK. It also allows use of one-time-pad cryptography where the random number or KDK is bigger than the message. The PIN is an index value into the list. So the size of the list could be small (relative to the size of the KDK), and the PIN could be easier to remember and to transfer between individuals. In an embodiment involving no other policy requirements, the KDF parameters (and associated operations) may be limited to the RPIN, or to the RPIN and the random number itself, and such an embodiment may be sufficient to ensure strong protection of the key migration action.

Figure 5:
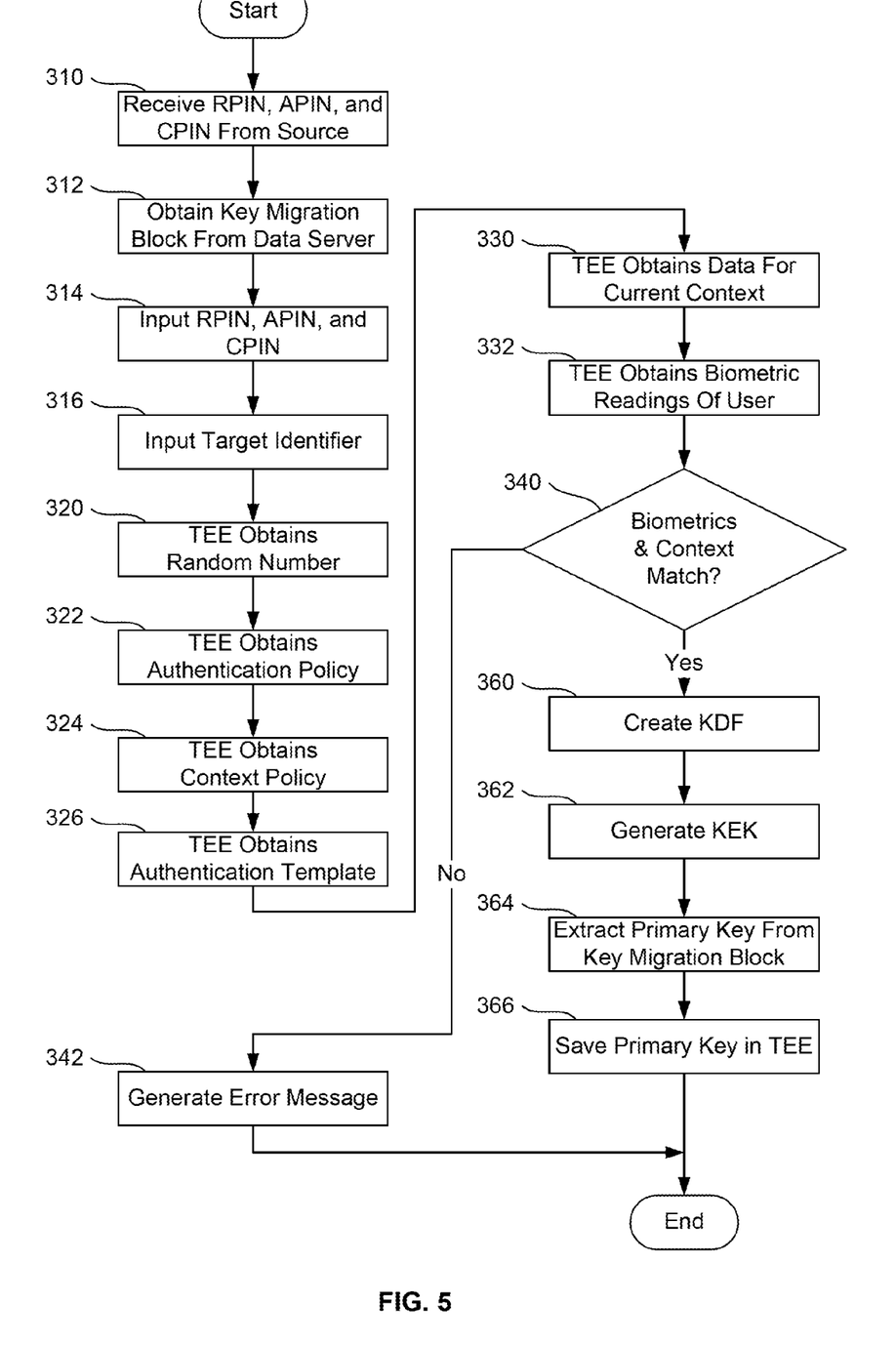
FIG. 5 presents a flowchart of an example process for migrating a key.

FIGS. 5A and 5B present a flowchart of an example process for migrating primary key 24. As described in greater detail below, Bob's TEE completes the migration by (a) re-assembling the KDF inputs, using random number server 70, authentication policy server 40, and context policy server 60, as needed, (b) applying the KDF function to reproduce KEK 28, and (c) using KEK 28 to unwrap key migration block 52.

The process of FIG. 5A starts after Alice has already copied key migration block 52 to data server 50. Then, as shown at block 310, Bob receives the required migration parameters (e.g., the RPIN, the APIN, the CPIN, the target identifier, etc.) from Alice. Also, as shown at block 312, TEE 32 obtains key migration block 52 from data server 50.

As shown at block 314, Bob then enters the RPIN, APIN, and CPIN values to TEE 32 using a trusted input channel. For example, TEE 32 may use trusted I/O technology to prompt Bob for the various input parameters. As shown at block 316, Bob may also enter into TEE 32 the identifier that was used by Alice to identify Bob.

As shown at blocks 320, 322, and 334, TEE 32 then uses the RPIN, APIN, and CPIN to retrieve the correct random number, authentication policy definition 42, and context policy definition 62 from random number server 70, authentication policy server 40, and context policy server 60, respectively. In other words, Bob opens a session with each of the required servers to receive query results, using the RPIN, APIN, CPIN as respective indexes. In addition, as shown at block 326, TEE 32 may retrieve, from authentication policy server 40, any authentication templates needed by the specified authentication policy.

As shown at block 330, TEE 32 then uses context sensors of destination DPS 30 to obtain data for the current context. As shown at block 332, TEE 32 then uses biometric sensors of destination DPS 30 to obtain biometric data from the current user. Alternatively, if required or allowed by the authentication policy, TEE 32 may use a reference template that was collected earlier and then stored locally to authenticate destination DPS 30 as belonging to Bob.

As shown at block 340, TEE 32 then determines whether (a) the biometric data from the current user matches the authentication template that was retrieved from authentication policy server 40 and (b) the data for the current context satisfies the context requirements defined in the context policy definition 62 that was retrieved from context policy server 60. As shown at block 342, if the biometric data doesn't match and/or if the current context does not satisfy the context requirements, TEE 32 generates an error message, and the process ends without TEE 32 unwrapping primary key 24.

However, as shown at block 360, if the biometrics and the context match the requirements, TEE 32 then creates a KDF, based on the parameters at destination DPS 30 that are required, according to the options selected earlier by Alice. For instance, TEE 32 may generate a KDF that uses parameters including the following: the RPIN, CPIN, and APIN entered by Bob, the corresponding random number from random number server 70, the corresponding authentication and context policies from authentication policy server 40 and context policy server 60, the current context data for destination DPS 30, a particular authentication reference template, and biometric data from the current user of destination DPS 30. Thus, in one embodiment or situation, TEE 32 generates a KDF with parameters that include one or more context policies and one or more actual context values (e.g. a policy which requires that the migration must start and end from the same location, and actual context values identifying the current geographical coordinates of the device.) The sampled sensor values can be included because they are known at both the time of origin and the time of completion. In the embodiment of FIG. 1, TEE 32 generates a KDF 26 that matches KDF 26 in TEE 22.

In different embodiments or situations, TEEs may generate KDFs with different sets of parameters. For example, the selected context policy definition may require the destination device to complete the migration before midnight, and the current context data may indicate that the current time is 11:30 pm. The TEE may therefore conclude that the current context is acceptable. And the TEE may then omit the current context data from the list of KDF parameters. Similarly, if the context policy requires the destination device to be located in Texas, the TEE may generate a KDF with a parameter for the context policy (e.g., "Allow if location is Texas"), and without a parameter for the actual context values sampled (e.g., the current geographic coordinates of the destination device). The policy author may determine if the granularity of the collected context values is such that it would be practical to assume they could be repeated to complete the migration.

After TEE 32 generates the KDF, TEE 32 then uses the KDF to generate a KEK, as shown at block 362. If TEE 32 supplied the KDF with all of the correct parameters, the generated KEK 28 will match KEK 28 of source DPS 20. As shown at block 364, TEE 32 then uses KEK 28 to decrypt key migration block 52 and extract or unwrap primary key 24. Destination DPS 30 may then save primary key 24 in TEE 32.

However, referring again to block 362, if any of the KDF inputs is incorrect, the generated KEK will not match KEK 28. Consequently, TEE 32 will be unable to decrypt key migration block 52 to access primary key 24. Accordingly, in FIG. 1, KDF 26 and KEK 28 are shown with dotted outlines in TEE 32, to indicate that they may not match the KDF and KEK in TEE 22.

The present disclosure describes innovative and useful ways to manage the inputs that are fed into KDFs. An advantage of one embodiment is that an attacker would need to compromise each supporting service in order to collect all of the inputs necessary to reconstruct the KDF. Using services to provide lists of potential elements, along with PINs to identify selected elements from those lists also provides benefits. For instance, MFA policies can be enumerated in a list, and an APIN can be used conveniently to communicate a particular policy from the list as part of the migration action. Similarly, contextual policies such as time-of-day constraints and location geo-fence constrains can be specified as part of the KDF using a service that enumerates context policy statements which include various options and combinations of options.

In one embodiment, if a destination TEE provides the proper data, a random number server provides the destination TEE with the same random number as was provided to a source TEE, an authentication policy server provides the destination TEE with the same authentication policy as was provided to the source TEE, and a context policy server provides the destination TEE with the same context policy as was provided to the source TEE. However, after the completion of a lifecycle (e.g., after key migration has been completed), the servers may modify, reorganize, or replace their respective lists, so that the RPIN, APIN, and CPINs that were used by Alice and Bob will identify different random numbers, authentication policies, and context policies.

In one embodiment, the random number server provides a large list. For example, the list may use an eight character PIN, using Arabic numerals. Consequently, the list may include 100 million entries. Alternatively, the list may use an eight character PIN, using all American Standard Code for Information Interchange (ASCII) printable characters. Consequently, the list may include over 6 quadrillion entries. Different embodiments may use extended ASCII character sets or any other suitable character encoding schemes to implement list index values, with the indexes translated to a larger numeric value. Also, different embodiments may use different sizes for the PIN or index, including without limitation PINs implemented as four, five, six, seven, or eight ASCII encoded binary bytes. Other embodiments may use PINs less than 16 bytes in size.

The size of the PINs may be relatively small, compared to the size of the random numbers pointed to by the PINs. For example, different embodiments may use random numbers with sizes of 16, 32, or 64 bytes (i.e., 128, 256, or 512 bits) or more. Accordingly, the PIN may be referred to as small, and the random number as large or vary large. Consequently, guessing which random number was used for a key migration block will be impractical. The attacker will need to use the list or database from the random number server. But the random number server can monitor and reject suspicious queries. For instance, the random number server can reject queries that match the signature of a password guessing attack.

In one embodiment, Alice manually chooses an RPIN from the list at random. In another embodiment, the TEE in the source DPS automatically selects the RPIN at random, using a random number generator. In other words, the RPIN may be a system generated PIN.

This disclosure refers to various operations that are performed by TEEs in the source and destination DPSs. In one embodiment, the source and destination TEEs include one or more software components that drive this process. For instance, the TEEs may include key migration software 27, and key migration software 27 may include a KDF generator 29.

Accordingly, in TEE 22 and TEE 32, key migration software 27 may prompt Alice and Bob to enter the required user input data (e.g., the RPIN, APIN, CPIN, etc.). Key migration software 27 may use trusted I/O channels to obtain user input, as described above. Key migration software 27 may also collect the biometric and context data. Key migration software 27 may also use KDF generator 29 to generate the KDFs based on the user input. Key migration software 27 may then use the resulting KDFs to generate the KEKs. And key migration software 27 may then use the resulting KEKs to encrypt or decrypt key migration block 52.

For purposes of this disclosure, terms like "random number" and "random number generator" should be understood as including pseudorandom numbers and pseudorandom number generators.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, minicomputers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with key migration capabilities. The data processing system comprises a processing element, a machine accessible medium responsive to the processing element, and data in the machine accessible medium. When that data is accessed by the processing element, the data enables the data processing system to become a destination data processing system that performs operations comprising: (a) receiving a key migration block that includes an encrypted version of a primary key from a source data processing system; (b) receiving user input that identifies an authentication policy; (c) receiving user input that identifies a context policy; (d) collecting authentication data from a user of the destination data processing system, based on the identified authentication policy; (e) collecting context data for the destination data processing system, based on the identified context policy; and (f) using the authentication data and the context data to decrypt the key migration block.

Example A2 includes the features of Example A1, and the machine accessible medium is configured to provide a trusted execution environment (TEE) in the destination data processing system. Also, the data in the machine accessible medium comprises key migration software that is configured to execute in the TEE, and the key migration software is configured to use the authentication data and the context data to decrypt the key migration block in the TEE of the destination data processing system.

Example A3 includes the features of Example A1, and the operation of collecting authentication data comprises collecting biometric data from the user of the destination data processing system. Example A3 may also include the features of Example A2.

Example A4 includes the features of Example A1, and the operation of collecting authentication data, based on the identified authentication policy, comprises collecting two or more different types of authentication data, based on the identified authentication policy. Example A4 may also include the features of any one or more of Example A2 through A3.

Example A5 includes the features of Example A1, and the operations further comprise (a) receiving user input that identifies a random number that was used to encrypt the primary key in the key migration block; and (b) using the random number to decrypt the key migration block. Example A5 may also include the features of any one or more of Example A2 through A4.

Example A6 includes the features of Example A5, and the operation of receiving user input that identifies the random number that was used to encrypt the primary key in the key migration block comprises receiving an index with a size less than 16 bytes. Also, the random number has a size greater than or equal to 16 bytes; and the operations further comprise using the index to retrieve, from a remote random number server, the random number. Example A5 may also include the features of any one or more of Example A2 through A4.

Example A7 includes the features of Example A1, and the operations further comprise retrieving the context policy from a remote context policy server, based on the user input that identifies the context policy. Example A7 may also include the features of any one or more of Example A2 through A6.

Example B1 is a method for migrating a key. The method comprises (a) at a destination data processing system, receiving a key migration block that includes an encrypted version of a primary key from a source data processing system; (b) at the destination data processing system, receiving user input that identifies an authentication policy; (c) at the destination data processing system, receiving user input that identifies a context policy; (d) collecting authentication data from a user of the destination data processing system, based on the identified authentication policy; (e) collecting context data for the destination data processing system, based on the identified context policy; and (f) at the destination data processing system, using the authentication data and the context data to decrypt the key migration block.

Example B2 includes the features of Example B1. In addition, the destination data processing system comprises a trusted execution environment (TEE); and the operation of using the authentication data and the context data to decrypt the key migration block is performed by key migration software executing in the TEE of the destination data processing system.

Example B3 includes the features of Example B1. In addition, the operation of collecting authentication data comprises collecting biometric data from the user of the destination data processing system. Example B3 may also include the features of Example B2.

Example B4 includes the features of Example B1. In addition, the operation of collecting authentication data, based on the identified authentication policy, comprises collecting two or more different types of authentication data, based on the identified authentication policy. Example B4 may also include the features of any one or more of Example B2 through B3.

Example B5 includes the features of Example B1. In addition, the method comprises, (a) at the destination data processing system, receiving user input that identifies a random number that was used to encrypt the primary key for the key migration block; and (b) using the random number to decrypt the key migration block. Example B5 may also include the features of any one or more of Example B2 through B4.

Example B6 includes the features of Example B5. In addition, the operation of receiving user input that identifies the random number that was used to encrypt the primary key in the key migration block comprises receiving an index with a size less than 16 bytes. Also, the random number has a size greater than or equal to 16 bytes; and the method further comprises using the index to retrieve, from a remote random number server, the random number. Example B6 may also include the features of any one or more of Example B2 through B4.

Example B7 includes the features of Example B1. In addition, the method comprises retrieving the context policy from a remote context policy server, based on the user input that identifies the context policy. Example B7 may also include the features of any one or more of Example B2 through B6.

Example B8 includes the features of Example B1. In addition, the method comprises retrieving the authentication policy from a remote authentication policy server, based on the user input that identifies the authentication policy. Example B8 may also include the features of any one or more of Example B2 through B7.

Example B9 includes the features of Example B1. In addition, the operation of using the authentication data and the context data to decrypt the key migration block comprises: (a) using the authentication data and the context data in a key derivation function (KDF); (b) using the KDF to generate a key encryption key (KEK); and (c) using the KEK to decrypt the key migration block. Example B9 may also include the features of any one or more of Example B2 through B8.

Example B10 includes the features of Example B1. In addition, the method comprises: (a) before receiving the key migration block at the destination data processing system, receiving, at the source data processing system, user input from an owner of the primary key, wherein the user input selects the authentication policy and the context policy; and (b) in response to receiving the user input selecting the authentication policy and the context policy, using the selected authentication policy and the selected context policy to create the key migration block that includes the encrypted version of the primary key. Example B10 may also include the features of any one or more of Example B2 through B9.

Example B11 includes the features of Example B10. In addition, the source data processing system comprises a trusted execution environment (TEE), and a plaintext version of the primary key resides in the TEE of the source data processing system. Also, the operations of (a) receiving the user input selecting the authentication policy and the context policy and (b) using the selected authentication policy and the selected context policy to create the key migration block are performed in the TEE of the source data processing system. Example B11 may also include the features of any one or more of Example B2 through B9.

Example B12 includes the features of Example B10. In addition, the method comprises: (a) receiving, at the source data processing system, a list of random numbers and corresponding indexes from a remote random number server; (b) after receiving the list of random numbers from the remote random number server, receiving user input selecting a random number from the list of random numbers; and (c) after receiving the user input selecting the random number, using the selected random number to generate the key migration block. Example B12 may also include the features of any one or more of Example B2 through B11.

Example C is at least one machine accessible medium comprising computer instructions for migrating a key. The computer instructions, in response to being executed on a data processing system, enable the data processing system to perform a method according to any one or more of Examples B1 through B12.

Example D is a data processing system with key migration abilities. The data processing system comprises a processing element, at least one machine accessible medium responsive to the processing element, and computer instructions stored at least partially in the at least one machine accessible medium. Also, in response to being executed, the computer instructions enable the data processing system to perform a method according to any one or more of Examples B1 through B12.

Example E is a data processing system with key migration abilities. The data processing system comprises means for performing the method of any one or more of Examples B1 through B12.

Example F1 is an apparatus to facilitate key migration. The apparatus comprises a non-transitory machine accessible medium and data in the machine accessible medium which, when accessed by a destination data processing system, enables the destination data processing system to perform operations comprising: (a) receiving a key migration block that includes an encrypted version of a primary key from a source data processing system; (b) receiving user input that identifies an authentication policy; (c) receiving user input that identifies a context policy; (d) collecting authentication data from a user of the destination data processing system, based on the identified authentication policy; (e) collecting context data for the destination data processing system, based on the identified context policy; and (f) using the authentication data and the context data to decrypt the key migration block.

Example F2 includes the features of Example F1. Also, the data in the machine accessible medium comprises key migration software that is configured to execute in a trusted execution environment (TEE) of the destination data processing system. Also, the key migration software is configured to use the authentication data and the context data to decrypt the key migration block in the TEE of the destination data processing system.

Example F3 includes the features of Example F1. Also, the operation of collecting authentication data comprises collecting biometric data from the user of the destination data processing system. Example F3 may also include the features of Example F2.

Example F4 includes the features of Example F1. Also, the operation of collecting authentication data, based on the identified authentication policy, comprises collecting two or more different types of authentication data, based on the identified authentication policy. Example F4 may also include the features of any one or more of Example F2 through F3.

Example F5 includes the features of Example F1, and the operations further comprise: (a) receiving user input that identifies a random number that was used to encrypt the primary key in the key migration block; and (b) using the random number to decrypt the key migration block. Example F5 may also include the features of any one or more of Example F2 through F4.

Example F6 includes the features of Example F5. Also, the operation of receiving user input that identifies the random number that was used to encrypt the primary key in the key migration block comprises receiving an index with a size less than 16 bytes. Also, the random number has a size greater than or equal to 16 bytes; and the operations further comprise using the index to retrieve, from a remote random number server, the random number. Example F6 may also include the features of any one or more of Example F2 through F4.

Example F7 includes the features of Example F1. Also, the operations further comprise retrieving the context policy from a remote context policy server, based on the user input that identifies the context policy. Example F7 may also include the features of any one or more of Example F2 through F6.

What is claimed is:

1. A data processing system with key migration capabilities, the data processing system comprising:
   a hardware processing element;
   a non-transitory, machine accessible medium responsive to the processing element; and
   data in the machine accessible medium which, when accessed by the processing element, enables the data processing system to become a destination data processing system that performs operations comprising:
      receiving a key migration block that includes an encrypted version of a primary key from a source data processing system;
      receiving user input that identifies an authentication policy;
      receiving user input that identifies a context policy;
      collecting authentication data from a user of the destination data processing system, based on the identified authentication policy;
      collecting context data for the destination data processing system, based on the identified context policy; and
      using the authentication data and the context data to decrypt the key migration block, wherein using the authentication data and the context data to decrypt the key migration block comprises (i) generating a key derivation function based on the authentication data and the context data, (ii) using the key derivation function to generate a key encryption key, and (iii) decrypting the key migration block with the key encryption key to access a plaintext version of the primary key.

2. A data processing system according to claim 1, wherein:
   the machine accessible medium is configured to provide a trusted execution environment (TEE) in the destination data processing system;
   the data in the machine accessible medium comprises key migration software that is configured to execute in the TEE; and
   the key migration software is configured to use the authentication data and the context data to decrypt the key migration block in the TEE of the destination data processing system.

3. A data processing system according to claim 1, wherein the operation of collecting authentication data comprises collecting biometric data from the user of the destination data processing system.

4. A data processing system according to claim 1, wherein the operation of collecting authentication data, based on the identified authentication policy, comprises:
   collecting two or more different types of authentication data, based on the identified authentication policy.

5. A data processing system according to claim 1, wherein the operations further comprise:
   receiving user input that identifies a random number that was used to encrypt the primary key in the key migration block; and
   using the random number to decrypt the key migration block.

6. A data processing system according to claim 5, wherein:
   the operation of receiving user input that identifies the random number that was used to encrypt the primary key in the key migration block comprises receiving an index with a size less than 16 bytes;
   the random number has a size greater than or equal to 16 bytes; and
   the operations further comprise using the index to retrieve, from a remote random number server, the random number.

7. A data processing system according to claim 1, wherein the operations further comprise:
   retrieving the context policy from a remote context policy server, based on the user input that identifies the context policy.

8. A method for migrating a key, the method comprising:
   at a destination data processing system, receiving a key migration block that includes an encrypted version of a primary key from a source data processing system;
   at the destination data processing system, receiving user input that identifies an authentication policy;
   at the destination data processing system, receiving user input that identifies a context policy;
   collecting authentication data from a user of the destination data processing system, based on the identified authentication policy;
   collecting context data for the destination data processing system, based on the identified context policy; and
   at the destination data processing system, using the authentication data and the context data to decrypt the key migration block, wherein using the authentication data and the context data to decrypt the key migration block comprises (i) generating a key derivation function based on the authentication data and the context data, (ii) using the key derivation function to generate a key encryption key, and (iii) decrypting the key migration block with the key encryption key to access a plaintext version of the primary key.

9. A method according to claim 8, wherein:
   the destination data processing system comprises a trusted execution environment (TEE); and
   the operation of using the authentication data and the context data to decrypt the key migration block is performed by key migration software executing in the TEE of the destination data processing system.

10. A method according to claim 8, wherein the operation of collecting authentication data comprises collecting biometric data from the user of the destination data processing system.

11. A method according to claim 8, wherein the operation of collecting authentication data, based on the identified authentication policy, comprises:
    collecting two or more different types of authentication data, based on the identified authentication policy.

12. A method according to claim 8, further comprising:
    at the destination data processing system, receiving user input that identifies a random number that was used to encrypt the primary key for the key migration block; and
    using the random number to decrypt the key migration block.

13. A method according to claim 12, wherein:
    the operation of receiving user input that identifies the random number that was used to encrypt the primary key in the key migration block comprises receiving an index with a size less than 16 bytes;
    the random number has a size greater than or equal to 16 bytes; and
    the method further comprises using the index to retrieve, from a remote random number server, the random number.

14. A method according to claim 8, further comprising:
retrieving the context policy from a remote context policy server, based on the user input that identifies the context policy.

15. A method according to claim 8, further comprising:
retrieving the authentication policy from a remote authentication policy server, based on the user input that identifies the authentication policy.

16. A method according to claim 8, further comprising:
before receiving the key migration block at the destination data processing system, receiving, at the source data processing system, user input from an owner of the primary key, wherein the user input selects the authentication policy and the context policy; and
in response to receiving the user input selecting the authentication policy and the context policy, using the selected authentication policy and the selected context policy to create the key migration block that includes the encrypted version of the primary key.

17. A method according to claim 16, wherein:
the source data processing system comprises a trusted execution environment (TEE);
a plaintext version of the primary key resides in the TEE of the source data processing system; and
the operations of (a) receiving the user input selecting the authentication policy and the context policy and (b) using the selected authentication policy and the selected context policy to create the key migration block are performed in the TEE of the source data processing system.

18. A method according to claim 16, further comprising:
receiving, at the source data processing system, a list of random numbers and corresponding indexes from a remote random number server;
after receiving the list of random numbers from the remote random number server, receiving user input selecting a random number from the list of random numbers; and
after receiving the user input selecting the random number, using the selected random number to generate the key migration block.

19. An apparatus to facilitate key migration, the apparatus comprising:
a non-transitory machine accessible medium; and
data in the machine accessible medium which, when accessed by a destination data processing system, enables the destination data processing system to perform operations comprising:
receiving a key migration block that includes an encrypted version of a primary key from a source data processing system;
receiving user input that identifies an authentication policy;
receiving user input that identifies a context policy;
collecting authentication data from a user of the destination data processing system, based on the identified authentication policy;
collecting context data for the destination data processing system, based on the identified context policy; and
using the authentication data and the context data to decrypt the key migration block wherein using the authentication data and the context data to decrypt the key migration block comprises (i) generating a key derivation function based on the authentication data and the context data, (ii) using the key derivation function to generate a key encryption key, and (iii) decrypting the key migration block with the key encryption key to access a plaintext version of the primary key.

20. An apparatus according to claim 19, wherein the operations further comprise:
receiving user input that identifies a random number that was used to encrypt the primary key in the key migration block; and
using the random number to decrypt the key migration block.

21. An apparatus according to claim 20, wherein:
the operation of receiving user input that identifies the random number that was used to encrypt the primary key in the key migration block comprises receiving an index with a size less than 16 bytes;
the random number has a size greater than or equal to 16 bytes; and
the operations further comprise using the index to retrieve, from a remote random number server, the random number.

22. An apparatus according to claim 19, wherein:
the data in the machine accessible medium comprises key migration software that is configured to execute in a trusted execution environment (TEE) of the destination data processing system; and
the key migration software is configured to use the authentication data and the context data to decrypt the key migration block in the TEE of the destination data processing system.

23. An apparatus according to claim 19, wherein the operation of collecting authentication data comprises collecting biometric data from the user of the destination data processing system.

24. An apparatus according to claim 19, wherein the operation of collecting authentication data, based on the identified authentication policy, comprises:
collecting two or more different types of authentication data, based on the identified authentication policy.

25. An apparatus according to claim 19, wherein the operations further comprise:
retrieving the context policy from a remote context policy server, based on the user input that identifies the context policy.

* * * * *